(12) United States Patent
Lee et al.

(10) Patent No.: US 6,364,919 B1
(45) Date of Patent: Apr. 2, 2002

(54) PROCESS FOR PREPARING METAL OXIDE SLURRIES SUITABLE FOR THE CHEMICAL MECHANICAL POLISHING OF SEMICONDUCTORS

(75) Inventors: Kil Sung Lee, Seoul; Jae Seok Lee, Euiwang-Shi; Seok Jin Kim, Seoul; Tu Won Chang, Taejon-Shi, all of (KR)

(73) Assignee: Cheil Industries, Inc. (KR)

( * ) Notice: Subject to any disclaimer, the term of this patent is extended or adjusted under 35 U.S.C. 154(b) by 0 days.

(21) Appl. No.: 09/535,865

(22) Filed: Mar. 27, 2000

(30) Foreign Application Priority Data

Aug. 20, 1999 (KR) .............................. 99-34608

(51) Int. Cl.$^7$ .......................... C09K 3/14; C01B 33/12; C01B 13/14; C01F 7/02; C01F 17/00
(52) U.S. Cl. ............... 51/309; 51/308; 106/3; 438/692; 438/693; 423/608; 423/263; 423/625; 423/335
(58) Field of Search .......................... 51/307, 308, 309; 106/3; 438/692, 693; 451/38; 423/608, 263, 335, 625

(56) References Cited

U.S. PATENT DOCUMENTS 5,383,372 A    1/1995  Qureshi et al.
5,904,159 A  *  5/1999  Kato et al. .................... 51/308

FOREIGN PATENT DOCUMENTS

EP            773270     *  5/1997

* cited by examiner

*Primary Examiner*—Michael Marcheschi
(74) *Attorney, Agent, or Firm*—Saliwanchik, Lloyd & Saliwanchik

(57) ABSTRACT

Disclosed is a process for preparing metal oxide slurries suitable for the chemical mechanical polishing (CMP) of semiconductor devices. A suspension of metal oxide in water is dispersed at a predetermined pressure through an orifice of a dispersion chamber while two intensifier pumps are used to maintain the pressure applied to the dispersion chamber constantly, resulting in restraining or minimizing the generation of macro particles as large as or larger than 1 $\mu$m. The metal oxide slurries are uniform in particle size with narrow particle size distribution and show excellent polishing performance with a significant reduction in the occurrence frequency of microscratches, so that they are suitable for CMP of ultra-integrated semiconductor devices.

20 Claims, 3 Drawing Sheets

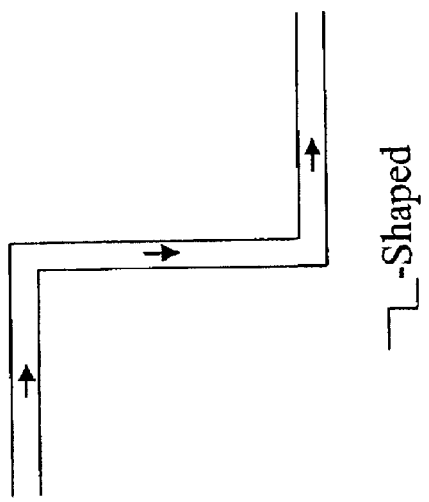
FIG. 4D ⌐-Shaped
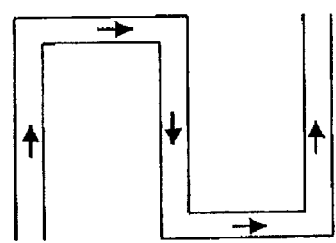
FIG. 4C ⊐-Shaped
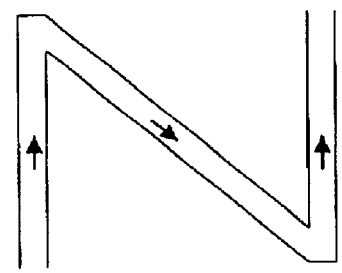
FIG. 4B Z-Shaped
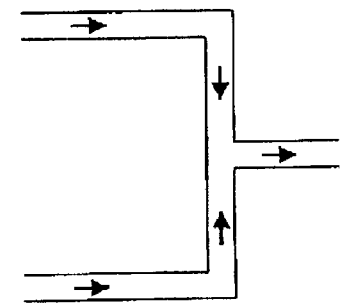
FIG. 4A Y-Shaped

PROCESS FOR PREPARING METAL OXIDE SLURRIES SUITABLE FOR THE CHEMICAL MECHANICAL POLISHING OF SEMICONDUCTORS

BACKGROUND OF THE INVENTION

1. Field of the invention

The present invention relates, in general, to a process for preparing metal oxide slurries for use in chemical mechanical polishing (CMP) of semiconductor devices and, more particularly, to the use of two complementary intensifier pumps in the dispersion of metal oxide slurries to maintain the pressure applied to the dispersion chamber constantly, thereby making the metal oxide slurries nearly free of macro particles.

2. Description of the Prior Art

To better achieve a lithography in the fabrication of semiconductor devices which have been gradually miniaturized and being of high integration and multi-layer structures, the CMP process is now indispensably used to conduct planarization over a wide area of which conventional spin-on-glass (SOG) or etchback techniques cannot take care. In the CMP process, a substrate is usually immersed in metal oxide slurry in conjunction with an elastomeric pad which is pressed against the substrate and rotated such that the slurry particles move across the substrate surface to accomplish wear and volumetric removal of the substrate surface.

It is naturally required for the metal oxide slurry used in the CMP process to be superior in dispersion stability and to be of high polishing rate and high purity as well as not to leave defects, such as microscratches, on the surface of the wafer after polishing. If occurring during the CMP process, the defects, such as microscratches, bring about a fatal consequence in the function and production yield of semiconductor devices.

The above requirements, except for the requirement of being of high purity, are in close connection to the particle size and size distribution of metal oxides, which are main components of the polishing slurries. For example, in regard to the particle size, larger particle sizes of metal oxides give a greater contribution to polishing rate, but result in poorer dispersion stability of slurries, causing the sedimentation of the particles and thus, requiring a stirring process prior to use. On the other hand, as the metal oxides are of smaller particle sizes, the dispersion stability becomes better with less occurrence in the frequency of microscratches. However, the rate of surface removal is reduced. As for the size distribution, the metal oxides are preferably uniform in particle size. For example, after being treated with a slurry which is in a broad range of particle size distributions, the substrate surface shows indigent flatness and is let to undergo the occurrence of a significant quantity of microscratches. Therefore, when taking account of polishing rate, dispersion stability, and microscratch occurrence, polishing slurries for the CMP of semiconductor devices preferably contain metal oxides with an appropriate range of particle sizes and size distributions.

Also important is the purity requirement for the slurries. Where the metal oxide slurries contain metal ions, such as sodium, they diffuse in the wafer, deteriorating the production yield of the semiconductors.

A conventional process for preparing CMP metal oxide slurries can be referred to U.S. Pat. No. 5,383,372 in which a metal oxide is agitated in a mixture with a chemical additive such as an alkaline material or an oxidant, in the presence of beads by use of a dynomill or ballmill. This process, however, suffers from significant problems in that the dispersion mechanism utilizing the impact of the beads on the mixture cannot avoid the pollution of the bead component as well as causes a tailing phenomenon in particle size distribution, making it difficult for metal oxide slurries to have uniform particle sizes. In addition, the bead friction lowers the dispersibility of the mixture with the lapse of time, aggravating the deviation of particle size and distribution by lots. Thus, it is difficult to reproduce identical polishing ability.

Another process for preparing CMP metal oxide slurries is disclosed by IKA, Germany, in which a rotor is rotated at a high speed to cause collision and friction against a stator. Although advantageous over the above-referred patent, this process still shows the same problems: the etching due to the collision against the stator and the dispersibility attenuation with the lapse of time.

In addition, the above-referenced processes both can reduce abrasive particles only to the size of about 1 $\mu$m, which is too large to be used suitably for CMP. Particularly, with feasibility to cause microscratches, such large abrasive particles are stoutly excluded from CMP slurries for use in shallow trench isolation (STI) as this process is fatally affected, in conjunction with the function and yield of semiconductor devices, by scratches.

Korean Patent Application No. 98-39212, yielded to the present inventors, discloses a novel process in which a fluid is accelerated at a high pressure to cause a cooperation of shearing force, impact and cavitation at an orifice of a dispersion chamber, through which metal oxide slurries are dispersed when passing. Simpler in procedure than and far superior in particle size distribution and polishing rate to conventional processes as it is, the previous process of the present inventors still needs to be improved in regard to microscratch occurrence.

BRIEF SUMMARY OF THE INVENTION

Leading to the present invention, the intensive and thorough research, repeated by the present inventors, on the relation of main parameters to the generation of macro-particles (as large as or larger than 1 $\mu$m in size) when metal oxide slurries are prepared by dispersion through an orifice at which a fluid is accelerated under a high pressure, resulted in the finding that the macro-particles can be prevented from being generated by controlling the pressure profile of the high pressure pump.

It is an object of the present invention to overcome the above problems encountered in prior arts and to provide a process for preparing metal oxide slurries, which are almost so exclusive of macro-particles as large as 1 $\mu$m in size as to be suitable for the CMP of semiconductor devices.

In accordance with the present invention, there is provided a process for preparing metal oxide slurries suitable for the chemical mechanical polishing of semiconductor devices, in which a suspension of metal oxide in water is dispersed at a predetermined pressure through an orifice of a dispersion chamber while two intensifier pumps are used to maintain the pressure applied to the dispersion chamber constantly.

BRIEF DESCRIPTION OF THE DRAWINGS

The above and other objects, features and other advantages of the present invention will be more clearly understood from the following detailed description taken in conjunction with the accompanying drawings, in which:

FIGS. 4a to 4d are schematic views showing various shapes of fluid paths available in the dispersion chamber of the present invention.

DETAILED DISCLOSURE OF THE INVENTION

The present invention relates to the preparation of silica ($SiO_2$)-, ceria ($CeO_2$)-, alumina ($Al_2O_3$)-, or zirconia ($ZrO_2$)-based slurries suitable for planarizing various structures, including a shallow trench isolation (STI) structure, an interlayer dielectric in a multi-layer metal structure, an intermetal dielectric structure, and a wire structure made of tungsten, aluminum or copper, through a CMP process.

No matter how fine they are, metal oxides inevitably gain particle size in aqueous solutions as the particles aggregate themselves. As a matter of fact, the metal oxides in an aqueous solution increase 100–10,000 folds more in particle size than their original state. Thus, the enlarged particles must undergo a dispersion process to give fine particles.

The application of the preferred embodiments of the present invention is best understood with reference to the accompanying drawings.

Figure 1:
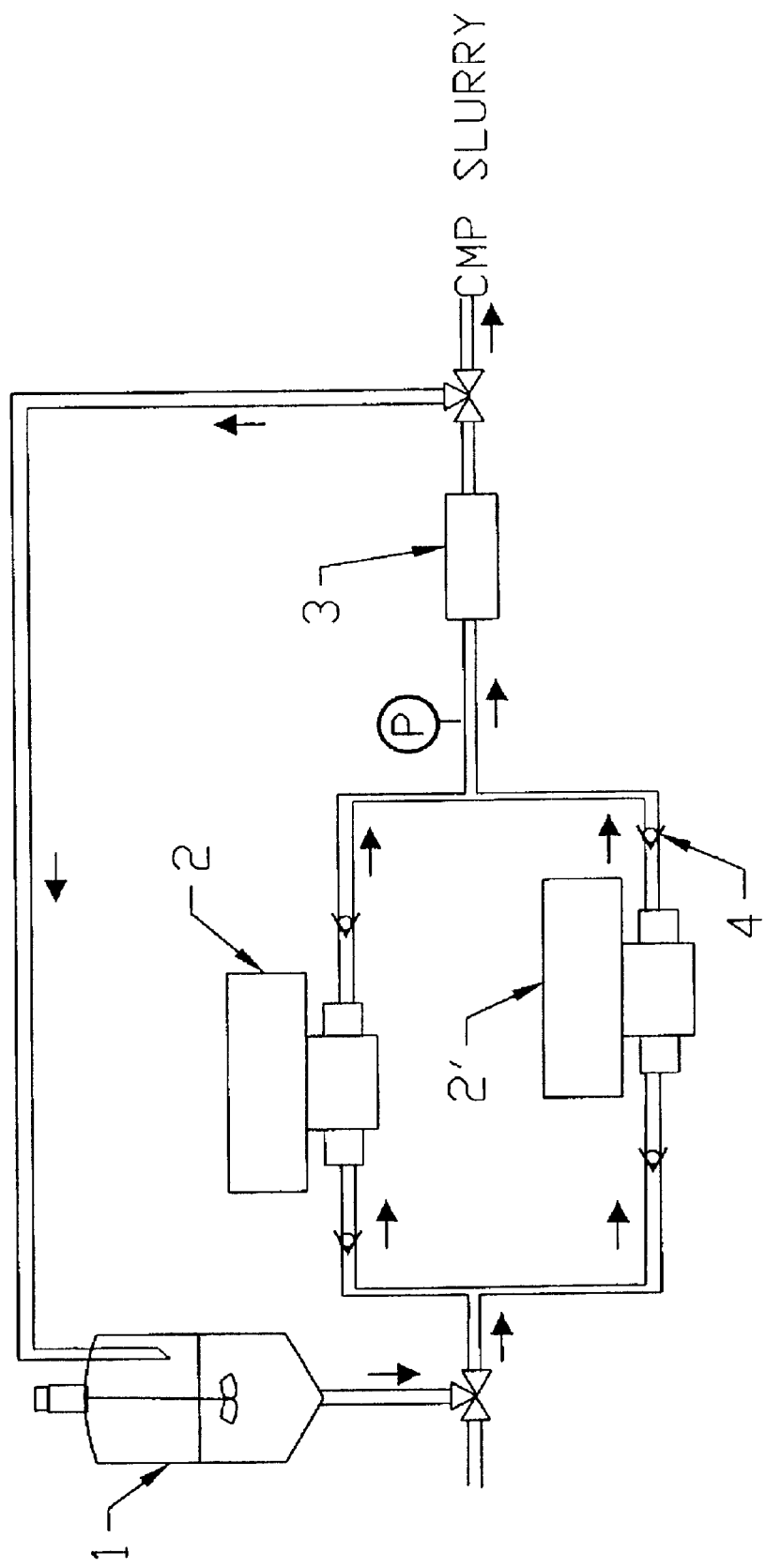
FIG. 1 is a schematic view showing a process flow of preparing metal oxide slurries suitable for the CMP of semiconductor devices, according to the present invention.

Referring to FIG. 1, there is a process flow for dispersing a metal oxide slurry, according to the present invention. Metal oxides are pre-mixed with water in a pre-mixing tank 1 and the slurry is introduced into an orifice of a dispersion chamber 3 at a speed of more than several hundreds meters per sec. In this regard, the acceleration of the slurry is controlled with the aid of two intensifier pumps 2 and 2' and check valves 4, so as to disperse the metal oxide particles. The collision with the fluid itself or the wall of microchannel, the shearing force, and the cavitation attributable to the pressure change also have significant influence on the dispersion of the slurry. These three factors to cause the dispersion, that is, collision, shearing force and cavitation exert themselves on the slurry, alone or in combination. The letter "P" represents a pressure gauge.

The metal oxide slurry finally obtained according to the process of the present invention is fine and has a uniform and narrow particle size distribution ranging from 20 to 510 nm. It is preferred that the slurry particles larger than 510 nm are returned back to the pre-mixing tank 1 to secure the quality of the final slurry.

Figure 2:
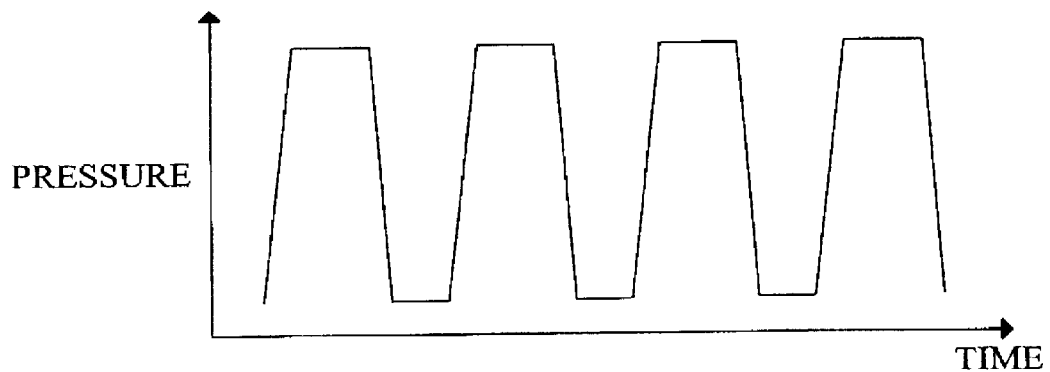
FIG. 2 is a pressure profile of a convention system using one intensifier pump.
Figure 3:
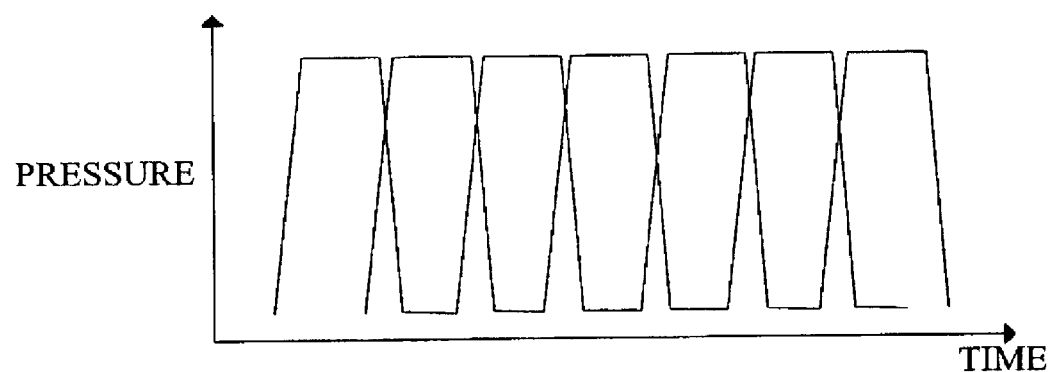
FIG. 3 is a pressure profile of a system using two intensifier pumps, according to the present invention.

If only one intensifier pump is employed in the dispersion process of the metal oxide slurry, the pressure applied to the dispersion chamber is not uniform, but pulsatile as shown in FIG. 2. Under the pulsation of the pressure, the slurry is made nonuniform in particle size with a broad particle size distribution and what is worse, there are produced macro-particles as large as or larger than 1 μm that are the main factor to cause microscratches. In contrast, the present invention employs two intensifier pumps which are operated in such an alternating way that they complement each other to keep the pressure applied to the dispersion chamber 3 constant, as shown in FIG. 3. Under the constant pressure, the slurry shows a narrow particle size distribution and the generation of macro-particles as large as or larger than 1 μm can be prevented or minimized. Therefore, the process of the present invention is particularly useful for the preparation of the metal oxide slurry suitable for the CMP of ultra-integrated semiconductor devices, which are fatally damaged upon occurrence of microscratches.

The pressure pulsation can be preferably modulated by controlling the acting time of the second pump. In accordance with the present invention, the modulation range of the pressure pulsation is within ±40% of the pressure predetermined and preferably ±10% to ±20%. For example, when the pressure pulsation deviates from the range of ±40% of the pressure predetermined, the effect that the present invention aims to produce cannot be achieved sufficiently. For special use, the slurries may be made finer and more uniform in particle size by narrowing the pressure pulsation into a range of ±5%. The orifice of the dispersion chamber 3 has a fluid path which is not particularly limited in shape. Examples of the available fluid paths in the present invention are given in FIGS. 4a to 4d which show a Y shape, a Z shape, an inverse S shape, and a crank shape.

The dispersion chamber 3 may be used, alone or in combination with another one or more in series.

Alternatively, an auxiliary chamber may be recruited prior to or subsequent to the dispersion chamber in order to enhance the dispersibility or protect the main chamber. When the material to be dispersed is apt to cause plugging, the auxiliary chamber is preferably installed prior to the main chamber irrespective of the orifice shape of the main chamber. On the other hand, when the orifice of the main chamber is of a Y-shape, the auxiliary chamber is preferably set subsequent to the main chamber, so as to maximize the effect of the counter collision of the fluid. In the case of recruiting an auxiliary chamber, its orifice preferably has a diameter about three times as large as that of the main chamber orifice for optimal pressure distribution into the auxiliary chamber. A three-fold larger orifice diameter of the auxiliary chamber allows the pressure to be distributed between the two chambers in a ratio of 9:1 the main chamber: the auxiliary chamber. Thus, while not so large a portion of the pressure is allowed to the auxiliary chamber, a sufficient effect can be drawn out of the auxiliary chamber when its orifice is three times as large in diameter as the main chambers.

As for the material for the orifices of both the main and the auxiliary chambers, its examples include engineering plastic, glass-reinforced plastic, carbon steel, stainless steel (SUS), ceramic, sapphire and diamond. Such orifices may be manufactured on the spot or commercially obtained.

It is possible for the orifice to have any size of diameter in dependence on the pressure. However, in consideration of the compatibility with the intensifier pumps and the dispersion efficiency, the orifice preferably ranges, in diameter, from 0.03 to 0.5 mm and more preferably 0.05 to 0.3 mm. For example, if the orifice diameter is below 0.03 mm, the chamber shows an excellent dispersion ability, but a poor flow rate and thus, a low productivity. On the other hand, if the orifice diameter is over 0.5 mm, the productivity increases, but the dispersion ability is deteriorated due to a decrease in the shearing force (ô) of the orifice. Dynamically, the shearing force (ô) is in proportion to the velocity of the fluid (ô μ ö) and in inverse proportion to the diameter of the orifice (ô μ 1/÷).

In the dispersion chamber, one orifice or many orifices may be provided. Upon a scale-up for mass production, it is preferred in terms of dispersion ability to use many orifices with a small diameter rather than a single orifice with a large diameter.

Depending on the orifice size and the pressure, the flow rate of the chamber is determined. The flow rate increases as the orifice diameter and the pressure increase. In more detail, the flow rate is proportional to a square of the orifice diameter and to a square root of the pressure. Based on this relation, a desired flow rate can be selected by a proper combination of an orifice diameter with an intensifier pump. For example, when a dispersion of silica in water is passed through Z-shaped orifice with a diameter of 0.08 mm at a pressure of 18,000 psi, its flow rate is about 550 ml/min. Increasing the pressure to 25,000 psi results in increasing the flow rate to about 800 ml/min.

Available in the present invention are the metal oxides which are prepared at more than 1,000° C. with a surface area of 20–300 $m^2/g$. For the preparation of CMP slurries of high polishing rates, metal oxide particles with a surface area of less than 100 $m^2/g$ are useful. Examples of such metal oxides include 'Aerosil 90G', 'Aerosil 50', manufactured by Degussa, Germany, and 'QS 09', manufactured by Tokuyama, Japan. These metal oxides may be used, alone or in combination. Particularly the present invention is effective to suspensions of metal oxides, such as $SiO_2$, $CeO_2$, $ZrO_2$, in deionized water added with acid and alkali.

In the pre-mixture of the metal oxides, a solid content preferably ranges from 1 to 50 weight % and more preferably 5 to 30 weight %. For example, if the solid content is less than 1 weight %, the effect of the present invention cannot be obtained. On the other hand, a solid content larger than 50 weight % causes a rapid increase in viscosity owing to thixotrophy to the extent of making it impossible to apply the slurry to the present invention. In practice, a stock with a high solid content is diluted to the preferable range. In general, it is preferred in terms of polishing performance and economical feasibility that a $SiO_2$ slurry has a solid content of 10–14 weight %, a $CeO_2$ slurry 1–5 weight %, and a $ZrO_2$ slurry 4–8 weight %.

A better understanding of the present invention may be obtained in light of the following examples which are set forth to illustrate, but are not to be construed to limit the present invention.

EXAMPLE I

The same process flow system as shown in FIG. 1 was used to prepare a CMP slurry.

130 g of silica with a surface area of 90 $m^2/g$, commercially available from Degussa, Germany, under the brand name of Aerosil 90G, was mixed with 18 g of a 20% KOH solution and 860 g of deionized water in a pre-mixing tank and made to pass once through the following dispersion chamber equipped with two intensifier pumps which maintained a pressure at 18,000 psi with a pressure pulsation in a range of 10% (180 psi). The sample passed through the dispersion chamber was measured for particle size distribution and average particle size with the aid of the Zetasizer 1000 (Malvern) and macro-particles as large as or larger than 1 μm were counted using the Accusizer 780 (PSS). The results are given in Table 1, below.

Organization of Dispersion Chamber.

Transfer Pump: Diaphragm 1–100 atm

Intensifier Pump: two pumps generating 5,000–30,000 psi (manufactured by Hydropack)

Main Chamber: G10Z (manufactured by Microfluidics)
  Orifice Shape: Z
  Orifice material: Diamond
  Orifice Diameter: 0.087 mm Auxiliary Chamber: L210Z (manufactured by Microfluidics)
  Orifice Shape: Z
  Orifice material: Ceramic
  Orifice Diameter: 0.250 mm Chamber Arrangement: Auxiliary Chamber preceded Main Chamber

EXAMPLES II THROUGH XII

The procedure of Example I was repeated, except that preset pressures and pressure pulsations were changed as indicated in Table 1, below. The results are given in Table 1.

TABLE 1

Dispersion Results according to Pressure and Pressure Pulsation

| Nos. of Exmpl. | Preset Press. (psi) | Press. Pulsation (%) | Avg. Particle Size (mn) | Size Distribution (nm) | Nos. of Macro Particles (ea/ml) |
|---|---|---|---|---|---|
| I | 18,000 | 10 | 155 | 20~389 | 1,200 |
| II | 18,000 | 5 | 152 | 20~389 | 870 |
| III | 18,000 | 20 | 155 | 20~389 | 1,544 |
| IV | 18,000 | 30 | 158 | 20~389 | 3,500 |
| V | 18,000 | 40 | 162 | 20~445 | 14,900 |
| VI | 18,000 | 50 | 172 | 20~445 | 67,450 |
| VII | 10,000 | 10 | 185 | 20~510 | 72,670 |
| VIII | 10,000 | 40 | 185 | 20~510 | 145,970 |
| IX | 15,000 | 10 | 165 | 20~445 | 7,200 |
| X | 15,000 | 40 | 167 | 20~445 | 34,005 |
| XI | 25,000 | 10 | 151 | 20~389 | 1,120 |
| XII | 25,000 | 50 | 151 | 20~389 | 6,945 |

EXAMPLES XIII THROUGH XVII

The procedure of Example I was repeated, except that the use of main chambers and auxiliary chambers and their arrangement followed the indications of Table 2, below. The results are given in Table 2, as well.

TABLE 2

Dispersion Results According to Arrangement of Dispersion Chambers

| Nos. of Exmpl. | Main Chamber | | | Aux. Chamber | | | Position of Aux. Chamber | Avg. Size (nm) | Size Distrib. (nm) | Nos. of Macro Particles (ea/ml) |
|---|---|---|---|---|---|---|---|---|---|---|
| | Brand Name | Shape | Size (nm) | Brand Name | Shape | Size (nm) | | | | |
| XIII | G10Z | Z | 0.087 | Not used | | | — | 155 | 20~389 | 1,750 |
| XIV | F12Y | Y | 0.075 | L210Z | Z | 0.250 | After | 163 | 20~389 | 3,450 |
| XV | F12Y | Y | 0.075 | Not used | | | — | 163 | 20~445 | 8,271 |
| XVI | H10Z | Z | 0.100 | L210Z | Z | 0.250 | before | 167 | 20~445 | 3,920 |
| XVII | H10Z | Z | 0.100 | Not used | | | — | 167 | 20~445 | 9,217 |

EXAMPLE XVIII THROUGH XIX

The procedure of Example I was repeated, except that ceria ($CeO_2$, surface area 30 $m^2/g$), instead of silica, was suspended without using the 20% KOH solution, and the pressure pulsation followed the indications of Table 3, below. The results are given in Table 3, as well.

EXAMPLES XX THROUGH XXIII

The procedure of Example I was repeated, except that alumina ($Al_2O_3$, surface area 70 $m^2/g$) or zirconia ($ZrO_2$, surface area 30 $m^2/g$), instead of silica, was used and the pressure pulsation followed the indications of Table 3, below. The results are given in Table 3, as well.

TABLE 3

Dispersion Results According to Metal Oxides

| Nos. of Exmpl. | Metal Oxides | pH | Press. Pulsation (%) | Avg. Size (nm) | Size Distrib. (nm) | Nos. of Macro Particles (ea/ml) |
|---|---|---|---|---|---|---|
| XVIII | Ceria | 7.3 | 10 | 172 | 40~445 | 13,450 |
| XIX | Ceria | 7.3 | 40 | 176 | 40~445 | 35,670 |
| XX | Alumina | 10.6 | 10 | 192 | 30~510 | 63,048 |
| XXI | Alumina | 10.6 | 40 | 197 | 30~510 | 132,420 |
| XXII | Zirconia | 10.7 | 10 | 190 | 30~445 | 49,030 |
| XXIII | Zirconia | 10.7 | 40 | 190 | 30~445 | 122,190 |

COMPARATIVE EXAMPLE I

The procedure of Example I was repeated, using one intensifier pump at 18,000 psi. A pressure pulsation was measured to amount to 18,000 psi in maximum and 1,000 psi in minimum. The results are given in Table 4, below.

COMPARATIVE EXAMPLE II

The procedure of Comparative Example I was repeated, except that ceria ($CeO_2$, surface area 30 $m^2/g$) was suspended without using a 20% KOH solution. The results are given in Table 4, below.

COMPARATIVE EXAMPLES III AND IV

The procedure of Comparative Example I was repeated, except that alumina ($Al_2O_3$, surface area 70 $m^2/g$) or zirconia ($ZrO_2$, surface area 30 $m^2/g$), instead of silica, was used. The results are given in Table 4, as well.

TABLE 4

| Nos. of Exmpl. | Metal Oxides | pH | Avg. Size (nm) | Size Distrib. (nm) | Nos. of Macro Particles (ea/ml) |
|---|---|---|---|---|---|
| C.I | Silica | 10.9 | 177 | 40~445 | 71,450 |
| C.II | Ceria | 7.3 | 176 | 40~445 | 142,305 |
| C.III | Alumina | 10.6 | 192 | 30~510 | 202,780 |
| C.IV | Zirconia | 10.7 | 197 | 30~510 | 178,565 |

[Polishing Performance Test]

Using a polishing machine 6EC, manufactured by Strasbaugh, the metal oxide slurries prepared in the above Examples and Comparative Examples were tested for polishing performance on 6-inch wafers coated with P-TEOS under the following condition. The wafers were polished with each of the slurries for 2 min and their polishing rates were determined from the thickness changes due to the worn, volumetric removal. Microscratches appearing on the surfaces of the wafers were counted using the KLA, manufactured by Tencor. The test results are given in Table 5, below.

Polishing Condition
Pad Type: IC1000/SubaIV Stacked (Rodel)
Platen Speed: 90 rpm
Quill Speed: 60 rpm
Pressure: 7 psi
Back Pressure: 0 psi
Temperature: 25° C.
Slurry Flow Rate: 150 ml/min

TABLE 5

| Nos. of Exmpl. | Size Distrib. (Avg. Size) (nm) | Polishing Performance | |
|---|---|---|---|
| | | Removal Rate (Å/min) | Microscratches (ea) |
| I | 20~389 (155) | 3,675 | 0 |
| II | 20~389 (152) | 3,660 | 0 |
| III | 20~389 (155) | 3,670 | 0 |
| IV | 20~389 (158) | 3,720 | 2 |
| V | 20~445 (162) | 3,690 | 8 |
| VI | 20~445 (172) | 3,790 | 19 |
| VII | 20~510 (185) | 3,755 | 5 |
| IX | 20~510 (165) | 3,695 | 12 |
| XI | 20~389 (151) | 3,575 | 0 |
| XIII | 29~389 (155) | 3,710 | 1 |
| XIV | 20~389 (163) | 3,655 | 0 |
| XV | 20~445 (163) | 3,700 | 5 |
| XVI | 20~445 (167) | 3,715 | 4 |
| XVII | 20~445 (167) | 3,700 | 5 |
| XVIII | 20~445 (172) | 13,350 | 25 |
| XX | 30~510 (192) | 6,750 | 87 |
| XXII | 30~445 (197) | 5,415 | 79 |
| C.I | 40~445 (177) | 3,710 | 53 |
| C.II | 40~445 (176) | 12,990 | 178 |
| C.III | 30~510 (192) | 6,595 | 367 |
| C.IV | 30~510 (197) | 5,415 | 273 |

As described hereinbefore, the use of two intensifier pumps in the dispersion of metal oxide slurries allows the dispersion chamber to be maintained at a constant pressure, resulting in restraining or minimizing the generation of macro particles, which are the main factor to cause microscratches upon CMP. Therefore, the metal oxide slurries prepared according to the process of the present invention have an uniform and narrow particle size distribution and show excellent polishing performance with a significant reduction in the occurrence frequency of microscratches, so that they are suitable for CMP of ultra-integrated semiconductor devices, which are fatally damaged upon occurrence of microscratches.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for preparing metal oxide slurries suitable for the chemical mechanical polishing of semiconductor devices, comprising
   dispersing a suspension of metal oxide in water through an orifice of a main dispersion chamber at a setting pressure; and
   maintaining the pressure applied to said dispersion chamber constant with at least two intensifier pumps.

2. The method as set forth in claim 1, wherein the pressure exerted by each intensifier pump is a pulsatile in the range of about ±40% of the setting pressure.

3. The method as set forth in claim 1, wherein the pressure exerted by each intensifier pump is a pulsatile in the range of about ±10 to ±20% of the setting pressure.

4. The method as set forth in claim 1, wherein the pressure exerted by each intensifier pump is a pulsatile in the range of about ±5% of the setting pressure.

5. The method as set forth in claim 1, wherein the metal oxide is selected from the group consisting of silica ($SiO_2$), ceria ($CeO_2$), alumina ($Al_2O_3$), and zirconia ($ZrO_2$).

6. The method as set forth in claim 1, wherein the metal oxide is silica ($SiO_2$).

7. The method as set forth in claim 1, wherein the metal oxide is alumina ($Al_2O_3$).

8. The method as set forth in claim 1, wherein the metal oxide is zirconia ($ZrO_2$).

9. The method as set forth in claim 1, wherein the metal oxide is ceria ($CeO_2$).

10. The method as set forth in claim 1, wherein the metal oxide has a surface area of about 20 to 300 $m^2/g$.

11. The method as set forth in claim 2, wherein the metal oxide has a surface area of about 20 to 300 $m^2/g$.

12. The method as set forth in claim 3, wherein the metal oxide has a surface area of about 20 to 300 $m^2/g$.

13. The method as set forth in claim 4, wherein the metal oxide has a surface area of about 20 to 300 $m^2/g$.

14. The method as set forth in claim 5, wherein the metal oxide has a surface area of about 20 to 300 $m^2/g$.

15. The method as set forth in claim 1, wherein the dispersion chamber is used, alone or in combination with one or more additional dispersion chambers, in series, said chambers being the same or different in orifice type.

16. The method as set forth in claim 1, wherein an auxiliary dispersion chamber is further used immediately before or immediately after the main dispersion chamber.

17. The method as set forth in claim 16, wherein the auxiliary dispersion chamber has an orifice which is three times as large in diameter as the orifice of the main dispersion chamber.

18. The method as set forth in claim 1, wherein the orifice has a diameter ranging from about 0.03 to 0.5 mm.

19. The method as set forth in claim 1, wherein the metal oxide has a particle size distribution ranging from about 20 to 510 nm.

20. A method for preparing metal oxide slurries suitable for the chemical mechanical polishing of semiconductor devices, comprising dispersing a suspension of metal oxide in water through an orifice of a dispersion chamber at a setting pressure, maintaining the pressure applied to said dispersion chamber constant with at least two intensifier pumps, wherein the pressure exerted by each intensifier pump is a pulsatile in the range of about ±5% of the setting pressure, and wherein the metal oxide is selected from the group consisting of silica ($SiO_2$), ceria ($CeO_2$), alumina ($Al_2O_3$), and zirconia ($ZrO_2$).

* * * * *